United States Patent
Nelson et al.

(10) Patent No.: US 7,229,047 B1
(45) Date of Patent: Jun. 12, 2007

(54) AIRCRAFT ROLL DISCONNECT MECHANISM

(75) Inventors: Bruce A. Nelson, Bagley, MN (US); Patrick J. Klausmeyer, Garden Plain, KS (US)

(73) Assignee: Cessna Aircraft Company, Wichita, KS (US)

( * ) Notice: Subject to any disclaimer, the term of this patent is extended or adjusted under 35 U.S.C. 154(b) by 8 days.

(21) Appl. No.: 11/214,210

(22) Filed: Aug. 30, 2005

(51) Int. Cl.
*B64C 13/30* (2006.01)

(52) U.S. Cl. ............... 244/99.2; 244/229; 244/232; 244/233

(58) Field of Classification Search ............... 244/99.2, 244/229, 232, 233; 74/471 R, 500.5, 501.6, 74/501.5 R, 96, 479.01, 480 R
See application file for complete search history.

(56) References Cited

U.S. PATENT DOCUMENTS

| 5,264,768 A | 11/1993 | Gregory et al. |
| 5,291,113 A | 3/1994 | Hegg et al. |
| 5,347,204 A | 9/1994 | Gregory et al. |
| 5,456,428 A | 10/1995 | Hegg |

*Primary Examiner*—Galen Barefoot
(74) *Attorney, Agent, or Firm*—Robert O. Blinn

(57) ABSTRACT

An aircraft flight control disconnect mechanism between the pilot and co-pilot controls, including a pair of concentrically positioned opposed circular jaws, each jaw having either mating tapered teeth or mating tapered openings, which when the jaws are axially separated, disconnects one pilot control from the other and a rotating control sleeve concentrically aligned with and rotatably attached to one of said jaws, the sleeve including a helical cam slot surrounding a fixed roller whereby rotation of the control sleeve moves the said connected jaw toward or away from the adjacent jaw so that the two jaws are free to rotate independent of each other.

7 Claims, 2 Drawing Sheets

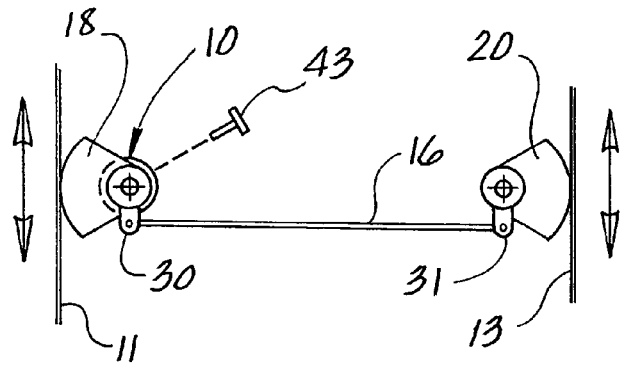
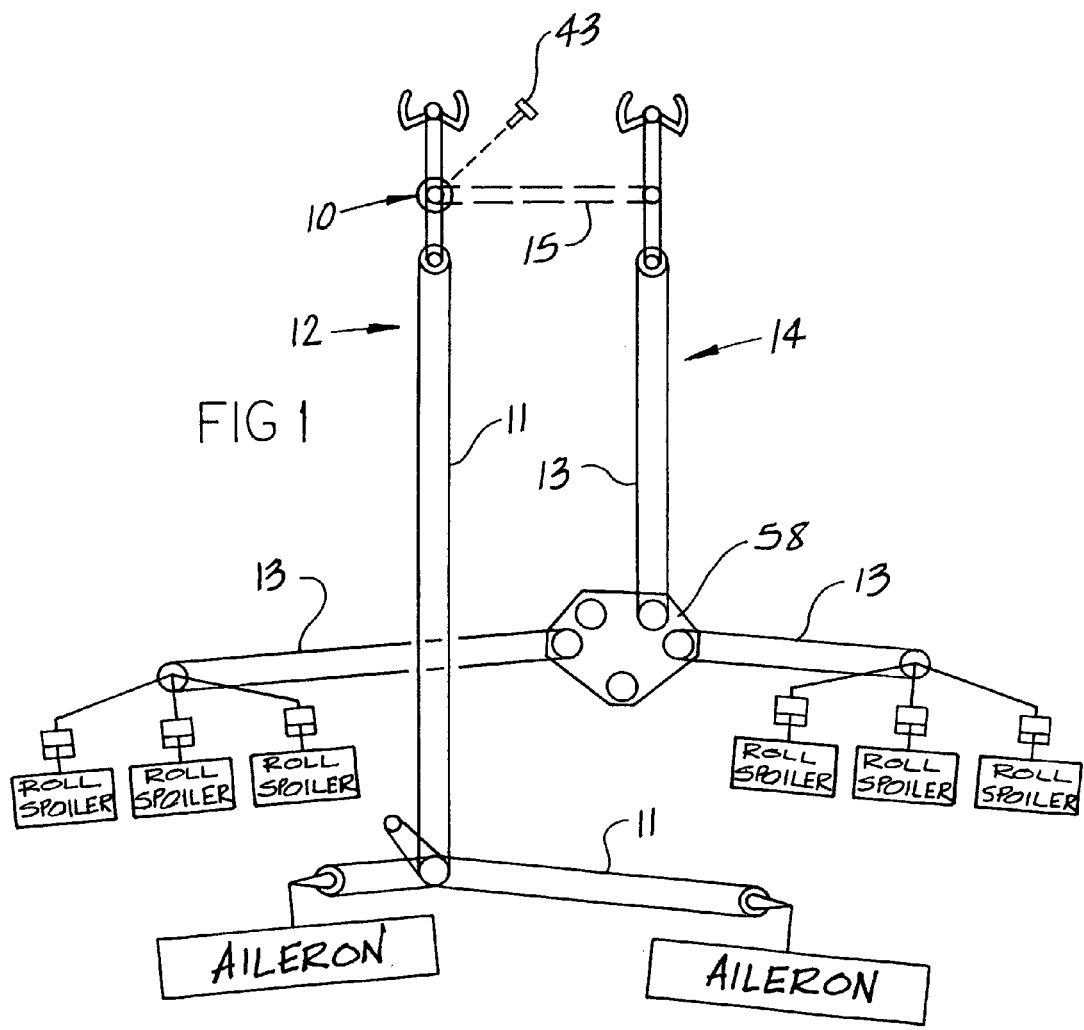

AIRCRAFT ROLL DISCONNECT MECHANISM

FIELD OF THE INVENTION

The present invention relates to aircraft flight controls and more specifically to the duel controls of a pilot and co-pilot and a disconnect mechanism which can release and separate the pilot and co-pilot controls whereby a degree of redundancy is obtained for basic flight control of the aircraft.

BACKGROUND OF THE INVENTION

Roll control of the Wright brothers aircraft was achieved by warping each wing in an opposite direction, that design was later transformed into ailerons at the ends of opposite wings, which are basically hinged flight surfaces along the trailing edge of the wing. When ailerons are moved in opposite directions, one wing files up while the other wing files down causing the aircraft to roll to the right or left. While conventional ailerons are still used in current aircraft designs, there are additional roll control devices used in the form of spoilers and speed brakes. Spoilers are flat surface devices, which extend out of the top surface of one wing or the other and cause the aircraft to roll by separating the airflow across the top surface of one wing thus destroying that wings lift. Speed brakes are similar flat surface on the top of the wing, which extend equally out of both wings into the airflow in the same manner as the spoiler. Speed brakes produce drag causing the aircraft to reduce its speed and reduce lift equally on both wings. Speed brakes in current aircraft designs have a separate control for extension and retraction, while ailerons and spoilers can be controlled together since they both affect roll control of the aircraft. The prior art teaches combining the effects of spoilers and ailerons in a single control. Also, the concept of tying the pilot and co-pilot controls together so that they both can work the ailerons, elevators and rudders is commonly done. The concept of connecting and disconnecting the pilot and co-pilot controls together is also old in the prior art as taught in the patent to Hegg (U.S. Pat. No. 5,456,428).

SUMMARY OF THE INVENTION

The present invention utilizes an aircraft flight control system whereby the pilot's controls are connected to the aircraft's ailerons for roll control in a conventional manner, such as closed loop cables or push rods and bell cranks which function in a well known manner. The co-pilot's controls are directly connected to the spoilers on opposite wings, which when actuated cause the aircraft to roll right or left. This provides redundancy in roll control since both the pilot and co-pilot have separate roll control functions through the ailerons and the spoilers. In case one system jams the disconnect mechanism is engaged separating both pilot controls so that the unjammed system in an emergency situation can control the aircraft.

The disconnect mechanism of the present invention normally connects the pilot and co-pilot controls together so that all pitch, roll and yaw commands can be exercised by either pilot or felt by either pilot. The disconnect mechanism includes a pair of concentrically positioned opposed circular jaws mounted on a common shaft with each jaw having either mating tapered teeth or mating tapered openings. When the jaws are separated, one pilot's control is disconnected from the other and they can act independent of each other. A rotating control sleeve concentrically aligned with and rotatably attached to one of said jaws includes a helical cam slot surrounding a fixed roller whereby rotation of the control sleeve moves the said connected jaw away from the adjacent jaw so that the two jaws are free to rotate independent from each other thus disconnecting the pilot controls from the co-pilot controls.

The control sleeve that separates the two jaws includes an offset leg to which is attached a linear actuating cable having a manually operated handle at its opposite end positioned in reach of the pilots so that upon pulling the handle the control sleeve rotates and moves axially on the fixed shaft due to the helical cam slot so as to separate said jaws and disengage the two pilot control systems. The rotary motion of the circular jaws are transposed into lineal motion through conventional sectors, around which are wrapped control cables in a closed loop so there is never slack between the aircraft control surface and the control cables. The cam slot in the control sleeve includes a straight portion in the locked position, which transcends into a helical portion, which separates the jaws and disconnects the two pilot control systems from each other as the control sleeve is rotated.

Therefore, the principal object of the present invention is to provide a redundant roll control system in an emergency situation when one of the flight control systems is blocked from movement.

Another object of the present invention is to provide a manually operated disconnect system wherein the manual force required to disconnect the two systems is proportionately less than the load between the two locked jaws so that it is easily actuated.

Another object of the present invention is to provide a roll disconnect system so that when the two flight control systems are locked together, they are precisely positioned, one relative the other with no slack or free play between the two pilot controls.

BRIEF DESCRIPTION OF THE DRAWINGS

FIG. 1 is a schematic illustration of an aircraft roll control system with the location of the roll disconnect mechanism of the present invention shown.

FIG. 2 is a schematic illustration of the connecting mechanism between the pilot and co-pilot controls and the location of the roll disconnect mechanism of the present invention.

DETAILED DESCRIPTION OF THE PREFERRED EMBODIMENT

Figure 3:
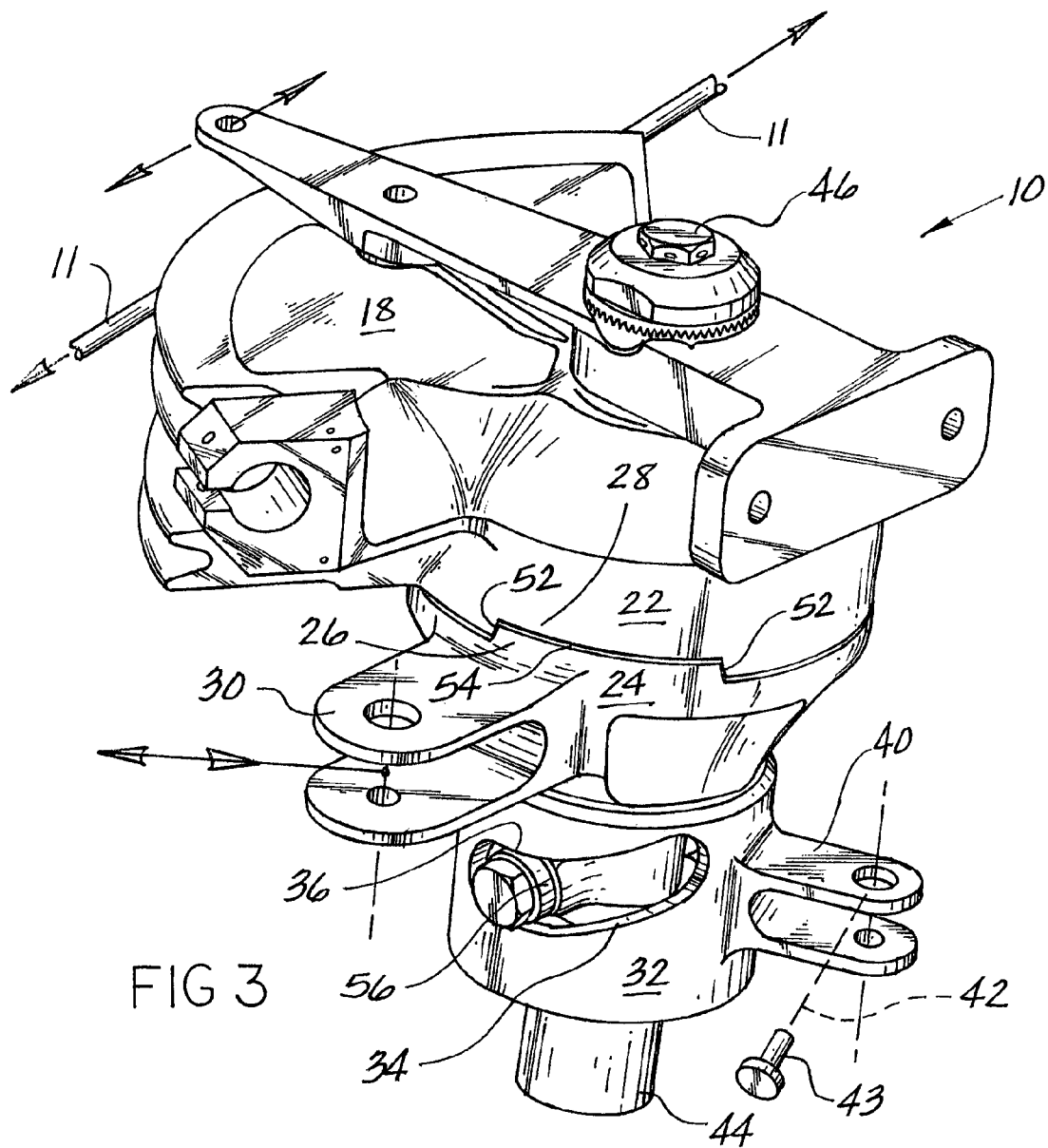
FIG. 3 is a perspective view of the roll disconnect mechanism of the present invention.
Figure 4:
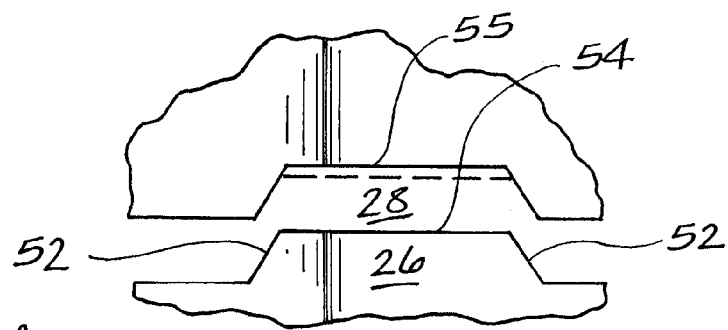
FIG. 4 is an elevational view of the tapered teeth and the corresponding mating opening of the disconnecting jaws of the present invention.

FIG. 1 schematically illustrates the roll controls of a dual control aircraft including the co-pilot control linkage 14 on the right and the main pilot control linkage 12 on the left. The pitch and yaw controls of the aircraft are standard and not shown since they are not part of the present invention. The closed loop cables 11 of the pilot control 12 connect to both ailerons, which include the conventional trim tabs not shown. The co-pilot control linkage 14 through cables 13 connects to a series of two spoilers 60 on each wing through a roll and speed brake mixer box assembly 58 which also is not part of the present invention. The pilot flight controls 12 are also connected to an autopilot servo 62 which when engaged provides basic roll control of the aircraft.

The connecting mechanism between the pilot and co-pilot controls 12 and 14 can be either a conventional closed loop cable 15 as shown in FIG. 1 or a push rod 16 as shown in FIG. 2 with connecting bell cranks 30 and 31 which rotate the pilot and co-pilot sectors 18 and 20 all of which is well know in the prior art. The disconnect mechanism generally described by reference numeral 10 is positioned in axial alignment under pilot sector 18 in FIG. 2.

The disconnect mechanism 10 comprises a pair of circular jaws 22 and 24 which are juxtaposed to each other an axial aligned on shaft 44 as shown in FIG. 3. Nut 46 attaches to shaft 44 and holds the disconnect mechanism together. Each circular jaw 22 and 24 includes an annular surface. The annular surface on jaw 24 includes a tapered tooth 26 having slightly tapered sides 52 and a flat top surface 54. Jaw 22 includes a tapered opening 28 on its annular surface having a shape which mates with tooth 26. The opening 28 having tapered sides which engage the tapered sides of tooth 26 prior to the top surface 54 contacting the bottom surface 55 of the tapered opening 28. The amount of taper on sides of tooth 26 and opening 28 is approximately 12 degrees and includes three tapered teeth 26 equally spaced around jaw 24 in 120 degree spacings. During operation the sectors 18 and 20 move through an angular distance less than 120 degrees.

Jaw 24 is connected to control sleeve 32, but is free to rotate relative to sleeve 32. There is no axial movement between jaw 24 and sleeve 32 by reason of overlapping of flanges between the two parts allowing unrestricted rotational movement relative to each other. Control sleeve 32 includes a helical cam slot 34, which has a horizontal straight portion 36 in the locked position as shown in FIG. 3.

Pilot control cable 11 is shown in FIG. 3 extending from the left side of sector 18 in cable sheave 48 and on the right side in cable sheave 48.

Attached to fixed shaft 44 is a roller type cam follower 56, which rides in helical cam slot 34. Cam slot 34 includes a straight portion 36 wherein the jaws 22 and 24 are in their locked position, as shown in FIG. 3. To unlock the jaws and separate the pilot flight controls sleeve 32 is rotated in a clockwise direction through the engagement of a handle 43 via cable 42, which attaches to offset leg 40. Initial rotation of sleeve 32 in the straight portion 36 of the cam slot is achieved with very little physical force on handle 43 even though there is a substantial load between jaws 22 and 24. Jaw 24 includes a bell crank 30, which in turn is attached to rod 16, as shown in FIG. 2, connecting to a bell crank 31, which is apart of co-pilot sector 20, as shown in FIG. 2.

OPERATION

In practically all conditions of flight the pilot and co-pilot controls 12 and 14 are tied together so that either pilot can control the aircraft in a roll condition. In this locked condition jaws 22 and 24 are precisely locked together without any free play, as shown in FIG. 3, whereby movement of either control achieves precisely the same flight control.

In any flight condition where its desired to separate the pilot and co-pilot controls, handle 43 is pulled thus rotating control sleeve 32 in a clockwise direction, as seen in FIG. 3, causing jaw 24 to move downward thereby separating from jaw 22 and permitting the pilot and co-pilot controls to be separately moved. This condition would be desirable in a situation where either the aileron control system or the spoiler control system was bound up thereby giving a redundancy for roll control of the aircraft. In another emergency situation it might be desirable to have the two flight controls tied together wherein a maximum manual of annular force was required to control the aircraft through both pilots.

Having generally described the invention in detail the same will be better understood from the following claims, which set forth the invention in a non-limiting manner.

What is claimed is:

1. In an aircraft flight control system having dual conventional mechanical controls for a pilot and co-pilot, which controls can be releasably tied together, the improvement comprising:
    a disconnect mechanism between the two pilot controls including:
        a pair of concentrically positioned juxtaposed circular jaws, each jaw having either mating tapered teeth or mating tapered openings, which when the jaws are axially separated disconnects one pilot control from the other;
        a rotating control sleeve concentrically aligned with and rotatably attached to one of said jaws, the sleeve includes an helical cam slot surrounding a fixed roller whereby rotation of the control sleeve moves the said connected jaw toward or away from the adjacent jaw so that the two jaws are free to rotate independent of each other.

2. In an aircraft flight control as set forth in claim 1 wherein the mating tapered teeth and openings have tapered sides and flat bottoms, which bottom surfaces never contact each other.

3. In an aircraft flight control system as set forth in claim 1 wherein one circular jaw has at least two tapered teeth and the other circular jaw has a similar shaped opening for engaging said teeth.

4. In an aircraft flight control system as set forth in claim 1, the helical cam slot has an initial relatively straight portion, which transcends into a helical portion whereby initial rotation of the control sleeve has no axial movement.

5. In an aircraft flight control system as set forth in claim 1, the mating tapered teeth of one jaw has a flat bottom portion and the adjacent jaw with teeth shaped openings has a planer engaging surface allowing the pair of jaws in contacting relation to rotate relative to each other until the tapered teeth engage the teeth shaped openings whereby the pair of jaws are locked together to in precise alignment with each other.

6. On disconnect mechanisms in an aircraft flight control system having dual controls for a pilot and co-pilot, which dual controls can be releaseably, tied together comprising:
    A pair of concentrically positioned juxtaposed circular jaws, each jaw having either mating tapered teeth or openings mating the tapered teeth, which when the jaws are axially separated disconnects one pilot control from the other;
    A rotating control sleeve concentrically aligned with and rotatably attached to one of said jaws, the sleeve includes an arcuate cam slot surrounding a fixed roller whereby rotation of the said sleeve moves said connected jaw toward or away from said adjacent jaw and the mating teeth and openings move apart so that the two jaws are free to rotate independent of each other.

7. A disconnect mechanism in an aircraft flight control system as set forth in claim 6 where:
    One of said pilot controls, controls roll of the aircraft through the ailerons while the other pilot control, controls roll through the use of spoilers.

* * * * *